US006966559B1

(12) United States Patent
Fischer et al.

(10) Patent No.: US 6,966,559 B1
(45) Date of Patent: Nov. 22, 2005

(54) SEALING BELLOWS WITH LUBRICANT RESERVOIR AT AXIAL END AND ASSEMBLY/INSTALLATION METHOD

(75) Inventors: Markus Fischer, Northville, MI (US); Eric Holmes, Ann Arbor, MI (US); Daniel Dearing, Northville, MI (US)

(73) Assignee: ZF Lemförder Metallwaren AG, Lemförde (DE)

( * ) Notice: Subject to any disclaimer, the term of this patent is extended or adjusted under 35 U.S.C. 154(b) by 0 days.

(21) Appl. No.: 10/896,498

(22) Filed: Jul. 22, 2004

(51) Int. Cl.[7] ........................... F16J 15/32; F16C 11/06

(52) U.S. Cl. ........................ 277/635; 277/645; 403/50; 403/51; 464/175

(58) Field of Search ................................ 277/634–635, 277/315–316, 645, 605; 403/50–51; 464/175

(56) References Cited

U.S. PATENT DOCUMENTS 2,692,783 A * 10/1954 Foss ........................... 277/356
4,209,179 A * 6/1980 Tolliver ........................ 277/605
4,410,185 A * 10/1983 Sporre ......................... 277/314
5,143,381 A * 9/1992 Temple ......................... 277/314
5,626,349 A * 5/1997 Sutherland et al. ......... 277/605
6,203,024 B1 * 3/2001 Liebich et al. .............. 277/634

FOREIGN PATENT DOCUMENTS

JP 05332351 A * 12/1993 ........... F16C 11/06

* cited by examiner

*Primary Examiner*—Alison Pickard
*Assistant Examiner*—Vishal Patel
(74) *Attorney, Agent, or Firm*—McGlew and Tuttle, P.C.

(57) ABSTRACT

A process for forming the ball and socket joint with bellows seal (10), a bellows seal (10) and a ball and socket joint with bellows seal (10) is provided including a ball pivot pin (36, 38) with a connection piece (40). The sealing bellows is provided with an annular engagement surface (16) with a cavity (20). The connection piece with a sealing face is connected to the ball pivot pin. Lubricant (22) is disposed in the cavity prior to assembly of the ball and socket joint. The annular engagement surface (16) is provided in contact with the sealing face upon assembly to cause an amount of lubricant (22) to be squeezed out of the cavity (20).

18 Claims, 5 Drawing Sheets

SEALING BELLOWS WITH LUBRICANT RESERVOIR AT AXIAL END AND ASSEMBLY/INSTALLATION METHOD

FIELD OF THE INVENTION

The present invention relates generally to joints and more particularly to a ball and socket joint assembly with a bellows or sealing boot and to the sealing boot.

BACKGROUND OF THE INVENTION

Ball and socket joins are known that have a sealing boot connected at one end to a housing of the ball joint and connected at another end to a knuckle (the connected piece or mating part—connected to the ball pin) and/or to the ball stud (ball pin). The end of the sealing boot is either directly applied to the ball stud or knuckle or is applied by the use of a sealing ring.

Sealing boots that are lubricated on the axial side to improve sliding behavior are known.

SUMMARY OF THE INVENTION

It is an object of the invention to provide a sealing bellows (sealing boot) for a joint that has an axial end (facing the knuckle) that is lubricated at the knuckle contact surface without getting on other joint parts (such as the ball stud).

It is an object of the invention to provide a sealing boot (bellows seal) to ball and socket joint part assembly and method of assembling that presents a good seal, particularly in an axial direction of the sealing boot and knuckle and in which the lubricant is protected in position on the sealing boot during shipment and is released in a simple manner on final assembly.

According to the invention, a ball and socket joint with bellows seal is provided including a ball pivot pin with a connection piece. A sealing bellows is provided with an annular engagement surface with a cavity. A connection piece with a sealing face is connected to the ball pivot pin. Lubricant is disposed in the cavity prior to assembly of the ball and socket joint. The annular engagement surface is provided in contact with the sealing face upon assembly to cause an amount of lubricant to be squeezed out of the cavity.

The cavity may be a groove with an annular opening with a flap portion at each side of said opening to restrict movement of the lubricant from the cavity until assembly. The cavity may also be a groove with an annular opening to the cavity in the form of a narrowed entrance gap with the annular engagement surface at each side of the narrowed entrance gap, the narrowed entrance gap restricting movement of the lubricant from the cavity until assembly.

The cavity may have an annular engagement surface side closed by one of a material of the sealing bellows and a membrane applied to the sealing bellows. The annular engagement surface side opening may allow a release of lubricant upon assembly.

The sealing bellows at the cavity may have a lubricant retaining portion defined by one of a narrowed gap and a material barrier at an entrance of the cavity. The lubricant retaining portion acts to retain at least a portion of the lubricant in the groove in a pre-assembly state prior to the annular engagement surface contacting the sealing face.

The bellows seal element may also have a pivot pin sealing surface engaged with the pivot pin. A clamping ring may be applied acting on an outside of the bellows to apply force to the bellows such that the pivot pin sealing surface statically engages with the pivot pin.

According to a further aspect of the invention, a process is provided for forming a ball and socket joint. The process includes providing a ball pivot pin seated in a ball joint housing via a bearing insert and providing a connection part with a radially extending surface having an opening for receiving the ball pivot pin as well as a bellows with a first connection end with an annular housing connection surface and another end with an annular engagement surface having a cavity at least partially filled with a lubricant. The bellows is connected to the housing. The ball pivot pin is moved into the opening of the connection part with the bellows contacting the annular engagement surface to the radially extending surface of the connection part to release lubricant from the cavity to a location between the annular engagement surface and the radially extending surface of the connection part.

According to a further aspect of the invention, a sealing boot is provided comprising a bellow element with an end having annular engagement surface and a cavity formed in the bellows element and opening to the annular engagement surface. A lubricant is disposed in the cavity.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 1:
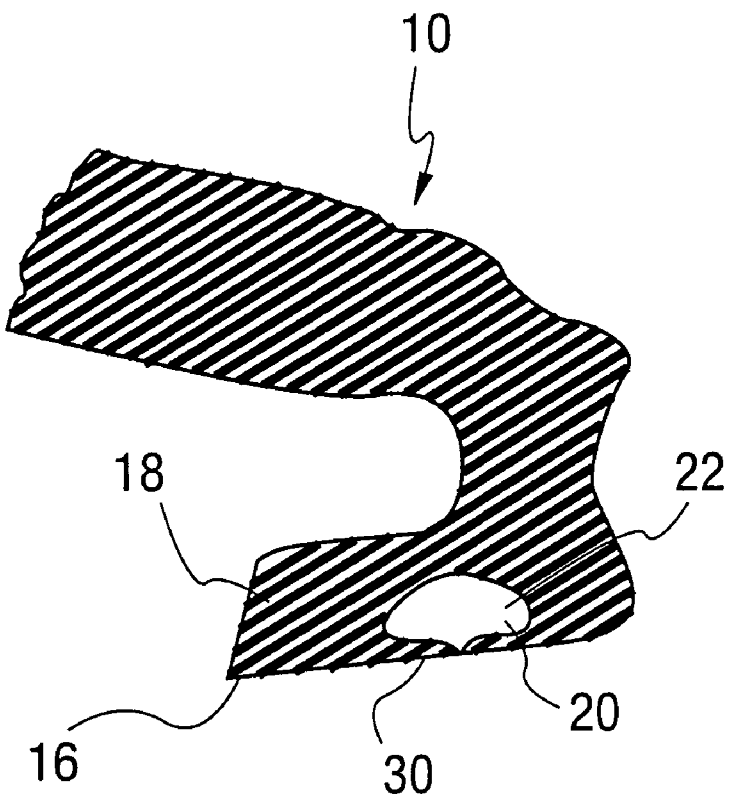
FIG. 1 is a sectional cutaway view showing an axial end of the boot seal with lubricant groove, pocket or pore according to the invention.

Referring to the drawings in particular, the invention comprises a sealing bellows or sealing boot generally designated 10. The sealing boot 10 has a housing end 15 (see FIG. 4) and a connection piece end 18. The connection piece end 18 has an annular surface 16 with an a cavity 20 in the form of an annular lubricant groove or pocket. The cavity is filled at least partially with a lubricant 22. The cavity 20 is closed on one side by material forming flaps 30.

Figure 2:
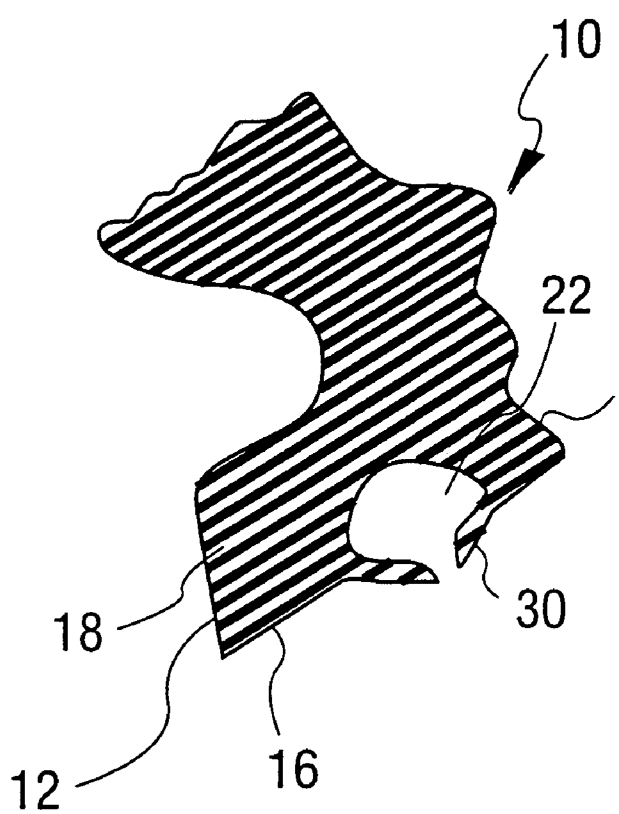
FIG. 2 is a sectional cutaway view showing an axial end of the boot seal that is pressed so lubricant in the lubricant groove, pocket or pore is released.

FIG. 2 shows the sealing boot 10 with the end 18 pressed at an inside 14 relative to an outside 12. The pressing at side 14 results in pressure on the lubricant 22, such that the flaps 30 are urged outwardly and lubricant 22 can flow through a gap between flaps 30.

Figure 3A:
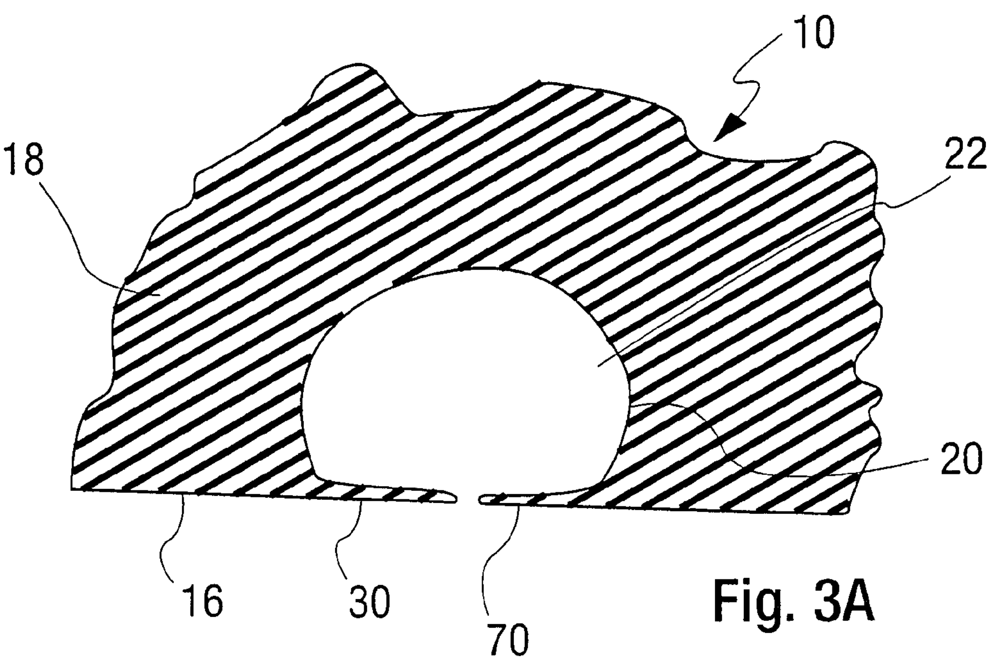
FIG. 3A is a sectional view of a knuckle facing side (axial end) of the sealing boot with lubricant groove, pocket or pore covered at least partially by a film or membrane (with or without perforation) or material flaps.

The pore, pocket or groove 20 provided with a lubricant 22 is shown in FIG. 3A. This lubricant 22 may be supplied in a preassembled state with the lubricant 22 already in position within the cavity 20. According to the embodiment of FIGS. 1, 2 and 3A, flaps 30 or a film or membrane thickness of material 70 is integrally formed with the sealing boot 10. The material 70 may extend uninterrupted across the lubricant cavity 20 or have a gap as shown in FIG. 3A. If no gap is provided, the lubricant 22 is injected through the membrane or material 70. The cavity 20 as shown in FIG. 3A is covered with flaps 30 extending from each sidewall at the surface 16. Prior to forming an assembly with the sealing boot 10, the lubricant 22 is fed into the groove 20, passing through the gap in the flaps 30. The flaps 30 effectively retain the lubricant 22 within the groove 20 until the surface 16 is positioned in an assembly position, in which case the lubricant is pressed out of the groove 20, as discussed further below.

Figure 3B:
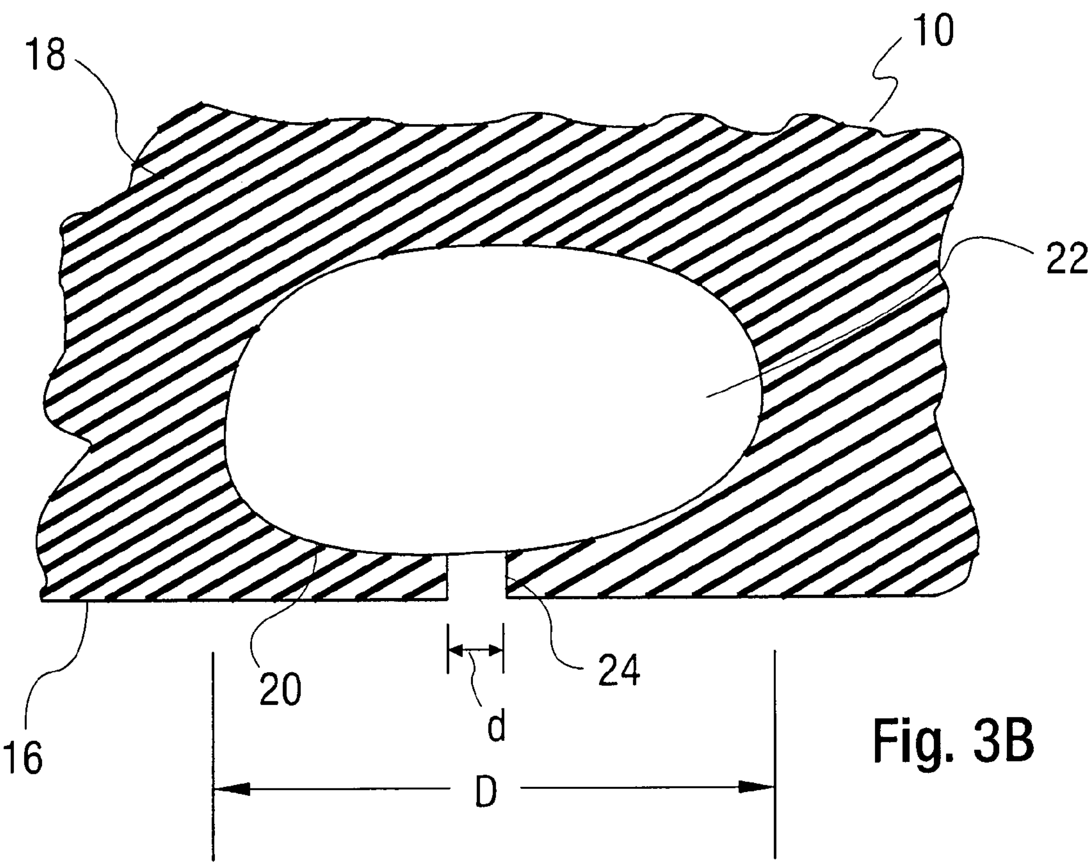
FIG. 3B is a sectional view of an alternative embodiment of the sealing boot at a knuckle facing side (axial end) of the sealing boot with lubricant groove, pocket or pore having a restricted dimension opening.

FIG. 3B shows an alternative embodiment of the cavity 20. The cavity or groove 20 cooperates with the surface 16 to define a gap 24. The gap 24 may have an advantageous ratio of the width d of the gap 24 to the width D of the cavity or groove 20. With a sufficiently small dimension d, the lubricant may be substantially retained in the space 22, even during shipping and handling. Further, a film may be applied over the gap 24 during shipping and handling. The lubricant may also be retained with a membrane formed integrally with sealing boot 18 wherein the lubricant is injected through the membrane. The membrane may then be broken to release the lubricant or preferably the lubricant is pressed out of the groove 20 during the assembly steps in which the membrane is broken or ruptured by the pressing (and from the internal pressure of the lubricant 22). The membrane may be perforated to define a weak area to rupture for lubricant 22 to be squeezed out of the cavity 20. The material 70 may have such a perforation or be precut to form the flaps 30 or such that flaps 30 form as the lubricant flows out of cavity 20 and the barrier 70 is ruptured.

Although the examples show the cavity 20 as a groove or continuous annular pocket 20, the cavity 20 may also be provided as one of several discrete pockets or pores that each have lubricant and retain the lubricant in any manner as described above. The material 70 may either be molded with the material of sealing boot 10 or the material to restrict passage of the lubricant may be applied to the already molded sealing boot 10.

Figure 4:
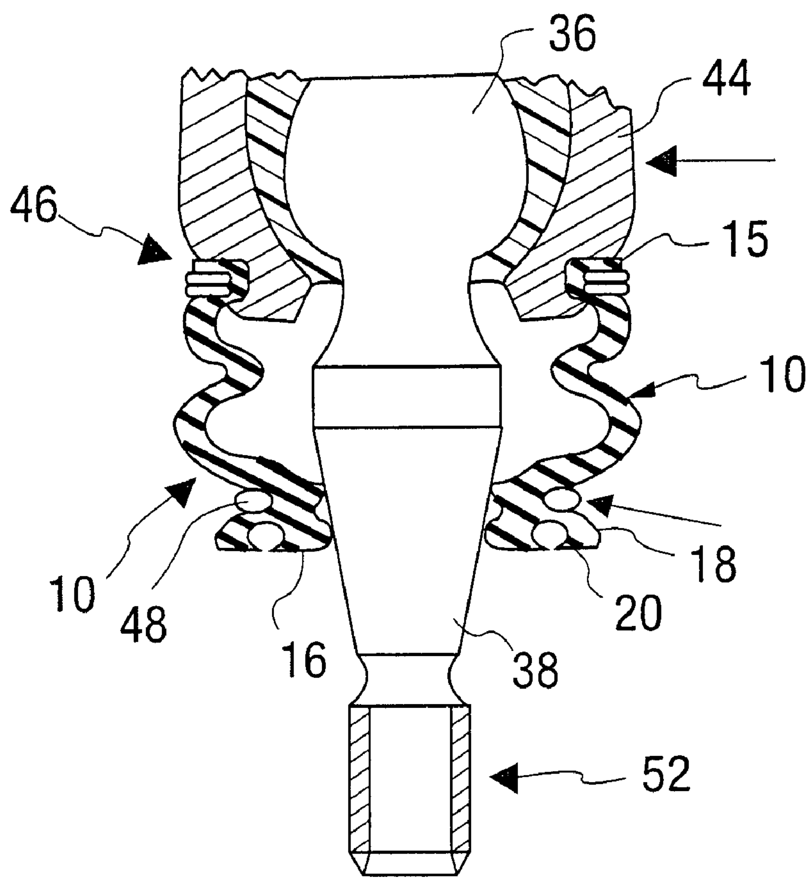
FIG. 4 is a partial sectional view of a ball joint ball and pin seated in a housing connected to a bellows (sealing boot) according to the invention.

The sealing boot 10 is advantageously used with a ball and socket joint including a ball 36 with a pin 38 as shown in FIG. 4. The ball 36 is seated in a housing 44 via an intermediate bearing insert 45. The pin 38 is connected to a connecting piece or knuckle 40 with end 52 extending through for further connection to another part. The sealing boot 10 is connected at end 15 to the housing 44 via a clamping ring 46. The end 18 of sealing boot 10 is connected to the pin 38 by a clamping ring 48.

Figure 5:
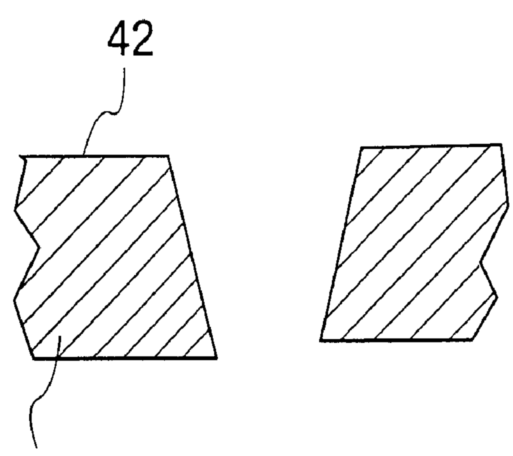
FIG. 5 is a sectional view showing a connected piece (knuckle) with a bellows contact surface (upper surface)

FIG. 5 shows the knuckle 40 with a sealing boot facing surface 42. The surface 42 cooperates with the sealing boot surface 16 to form a seal between the sealing boot 10 and knuckle 40.

Figure 6C:
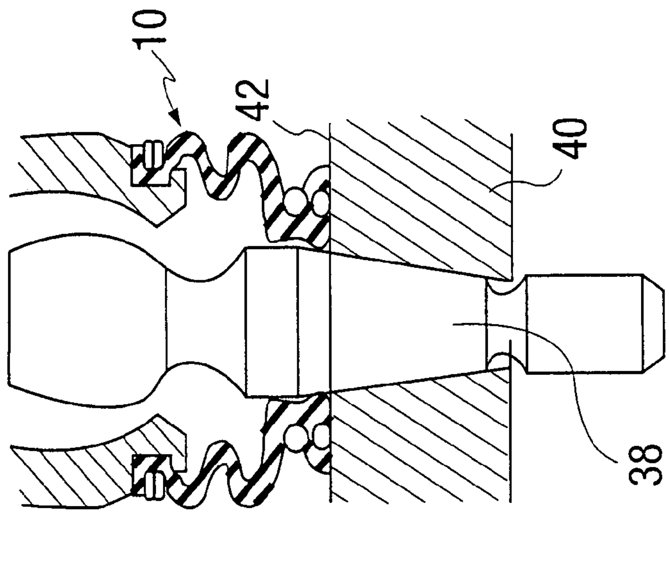
FIG. 6C is a sectional view showing the assembled state.
Figure 6B:
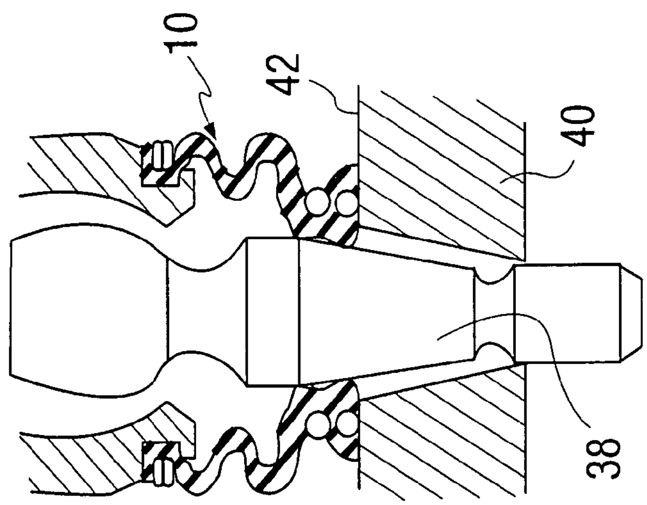
FIG. 6B is a sectional view showing another state of assembly as the ball pin advances with respect to the connected piece.
Figure 6A:
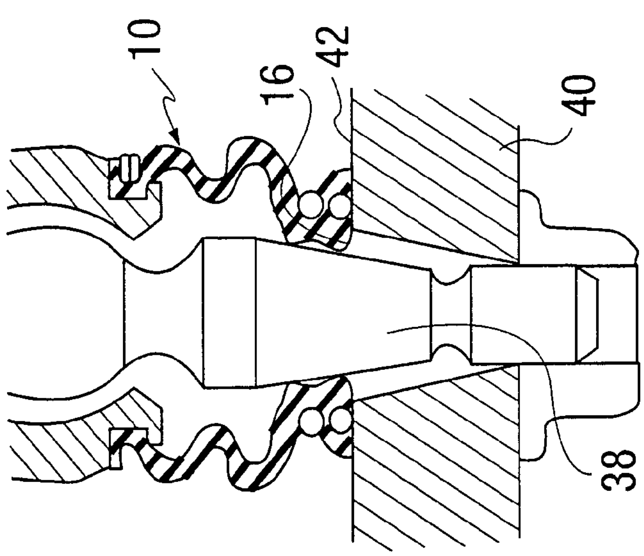
FIG. 6A is a sectional view showing a state of assembly with the sealing boot contacting the knuckle contact surface.
Figure 7A:
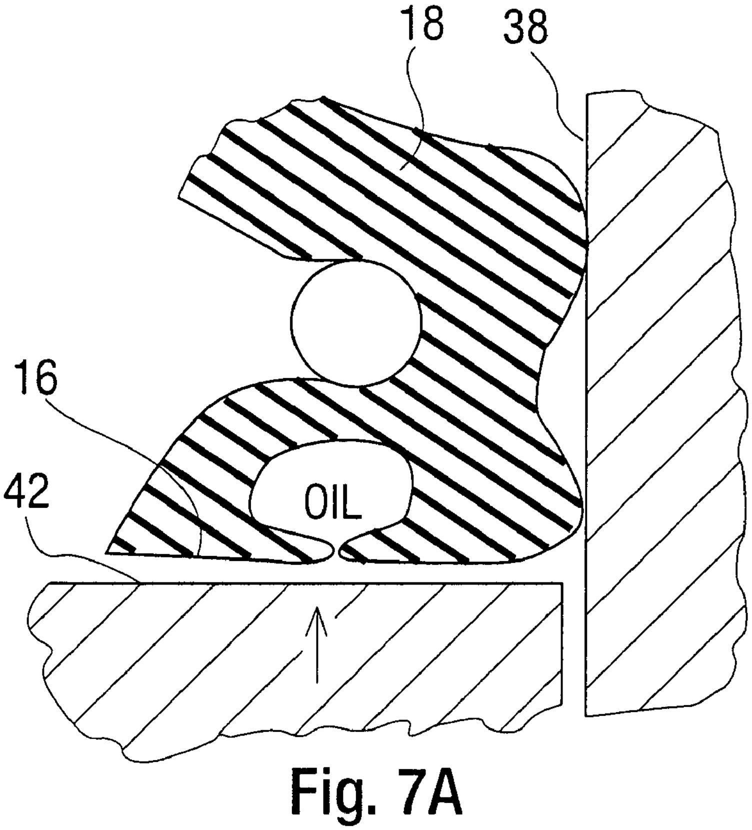
FIG. 7A is an enlarged sectional view showing the sealing boot in a pre-assembly state, relatively positioned for engagement.
Figure 7B:
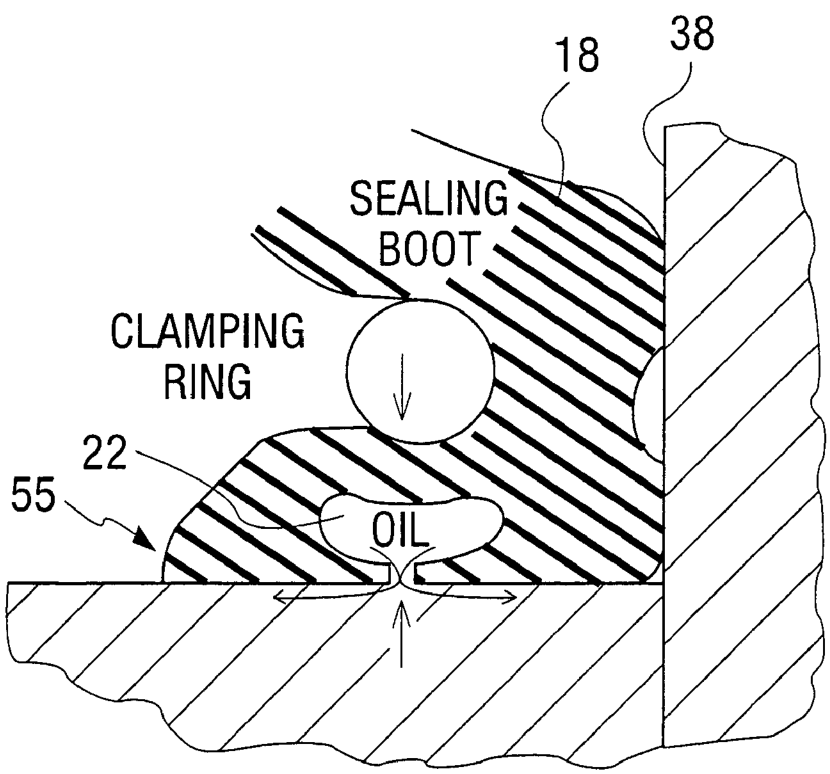
FIG. 7B is an enlarged sectional view showing the sealing boot and knuckle.

FIGS. 6A–6C show the assembly process in which a tapered surface of the pin 38 is seated in contact with the tapered surface of the knuckle 40. In FIG. 7A the surface 16 is positioned over the surface 42 (see also FIG. 7A). With the movement of the stud 38 into a seated position in the opening of the knuckle 40 the sealing boot 10 applies force toward the knuckle 40. Some amount of lubricant 22 may exit the space 22 for reducing friction for relative slip between sealing boot 10 and surface 42 and for improving sealing characteristics. As shown in FIG. 7B, a good seal is provided based on the water ingress path 55 passing through to lubricant 22.

While specific embodiments of the invention have been shown and described in detail to illustrate the application of the principles of the invention, it will be understood that the invention may be embodied otherwise without departing from such principles.

What is claimed is:

1. A ball and socket joint with bellows seal, the ball and socket joint comprising:

a ball pivot pin with a connection piece;

a sealing bellows with an annular engagement surface with a cavity closed at an inner radial side by material of the sealing bellows and closed at an outer radial side by material of the sealing bellows;

a connection piece with a sealing face;

lubricant disposed in said cavity prior to assembly of the ball and socket joint, the annular engagement surface contacting said sealing face upon assembly to cause an amount of lubricant to be squeezed out of said cavity.

2. A ball and socket joint with a bellows seal according to claim 1, wherein said cavity is a groove with an annular opening with a flap portion at each side of said opening to restrict movement of the lubricant from said cavity until assembly.

3. A ball and socket joint with a bellows seal according to claim 1, wherein said cavity is a groove with an annular opening to said cavity in the form of a narrowed entrance gap with said annular engagement surface at each side of said narrowed entrance gap, said narrowed entrance gap restricting movement of the lubricant from said cavity until assembly.

4. A ball and socket joint with a bellows seal according to 1, wherein said cavity has an annular engagement surface side closed by one of a material of said sealing bellows and membrane applied to said sealing bellows, said annular engagement surface side opening to allow a release of lubricant upon assembly.

5. A ball and socket joint with a bellows seal according to claim 1, wherein said sealing bellows at said cavity has a lubricant retaining portion defined by one of a narrowed gap and a material barrier at an entrance of said cavity, said lubricant retaining portion acting to retain at least a portion of said lubricant in said cavity in a pre-assembly state prior to said annular engagement surface contacting said sealing face.

6. A ball and socket joint with a bellows seal according to claim 1, wherein said bellows seal element has a pivot pin sealing surface engaged with said pivot pin.

7. A ball and socket joint with a bellows seal according to claim 6, further comprising a clamping ring acting on an outside of the bellows to apply force to the bellows such that the pivot pin sealing surface statically engages with said pivot pin.

8. A sealing boot, comprising:

a bellows element with an end having annular engagement surface;

a cavity formed in said bellows element closed at an inner radial side by material of the sealing bellows and closed at an outer radial side by material of the sealing bellows and opening to said annular engagement surface with a radial inner side of said annular engagement surface at one side of said opening of said cavity and with a radial outer side of said annular engagement surface at another side of said opening of said cavity;

lubricant disposed in said cavity.

9. A sealing boot according to claim 8, further comprising a lubricant retaining means for substantially retaining said lubricant in said cavity prior to said sealing boot being employed in a ball and socket joint assembly and allowing a release of an amount of lubricant upon the sealing boot being employed in a ball and socket joint assembly.

10. A sealing boot according to claim 9, wherein said lubricant retaining means is defined by one of a narrowed gap at an entrance to said cavity, a material barrier at an entrance of said cavity and a portion of said bellows element at least partially covering said cavity, said lubricant retaining portion acting to retain at least a portion of said lubricant in said cavity in a pre-assembly state and releasing.

11. A sealing boot according to claim 9, wherein said end of said bellows element has a pivot pin sealing surface engaged with said pivot pin, said pivot sealing surface being adjacent to said annular engagement surface.

12. A sealing boot according to claim 11, further comprising a clamping ring receiving surface to receive a clamping ring on an outside of said bellows element to apply force to the bellows element such that the pivot pin sealing surface statically engages with said pivot pin.

13. A sealing boot according to claim 8, wherein said cavity includes an annular groove portion with said annular engagement surface extending radially as a flap portion at each side of said opening to restrict movement of the lubricant from said cavity until assembly.

14. A sealing boot according to claim 8, wherein said cavity includes an annular groove portion with an annular opening to said cavity in the form of a narrowed entrance gap with said annular engagement surface at each side of said narrowed entrance gap, said narrowed entrance gap restricting movement of the lubricant from said cavity until assembly.

15. A sealing boot according to claim 8, wherein said cavity facing said annular engagement surface is closed by one of a material of said sealing bellows and membrane applied to said sealing bellows, said annular engagement surface side opening to allow a release of lubricant upon assembly.

16. A ball and socket joint with a bellows seal according to claim 1, wherein a radial inner side of said annular engagement surface is at one side of said opening of said cavity and a radial outer side of said annular engagement surface is at another side of said opening of said cavity.

17. A ball and socket joint with bellows seal, the ball and socket joint comprising:

a ball pivot pin with a connection piece;

a sealing bellows with an annular engagement surface with a cavity;

a connection piece with a sealing face;

lubricant disposed in said cavity prior to assembly of the ball and socket joint, the annular engagement surface contacting said sealing face upon assembly to cause an amount of lubricant to be squeezed out of said cavity, wherein said cavity is a groove with an annular opening with a flap portion at each side of said opening to restrict movement of the lubricant from said cavity until assembly.

18. A ball and socket joint with bellows seal, the ball and socket joint comprising:

a ball pivot pin with a connection piece;

a sealing bellows with an end part having an annular engagement surface, said sealing bellows defining a closed pocket cavity with sealing bellows material flaps closing a side of said pocket cavity at said annular engagement surface;

a connection piece with a sealing face;

lubricant disposed in said cavity prior to assembly of the ball and socket joint, the annular engagement surface contacting said sealing face upon assembly to cause an amount of lubricant to pass said material flaps.

* * * * *